3,149,913
PROCESS FOR PRODUCING NITROSYL-
SULFURIC ACID
Louis L. Ferstandig, El Cerrito, and Paul C. Condit, San Anselmo, Calif., assignors to California Research Corporation, San Francisco, Calif., a corporation of Delaware
No Drawing. Filed June 14, 1961, Ser. No. 116,957
3 Claims. (Cl. 23—139)

This invention relates to a proces for the production of nitrosylsulfuric acid.

Nitrosylsulfuric acid is particularly desirable for use in the production of caprolactam from hexahydrobenzoic acid. Nitrosylsulfuric acid has long been known as an intermediate in connection with the lead-chamber sulfuric acid process in which it is converted to sulfuric acid with concurrent liberation of nitric oxide in a reaction with sulfur dioxide. Several methods by which nitrosylsulfuric acid may be prepared are known, but they all suffer from serious limitations. The usual method of choice in the art is the neat reaction of sulfur dioxide with fuming nitric acid. The yields are poor, and there is a constant safety hazard. For unexplained reasons, violent autocatalytic temperature effects accompanied by explosive action are frequently experienced in the synthesis. For reasonable safety, reaction temperatures must be kept below about 5° C.

It has now been found that nitrosylsulfuric acid may be produced by reacting sulfur dioxide with a liquid solution of nitric acid in sulfuric acid, the solution having an equivalent $H_2O$ to $SO_3$ ratio in the range of about 1.7–0.17. Conversions and yields are excellent and the reaction proceeds safely.

Concentrated sulfuric acid is a very potent dehydrating medium, yet surprisingly in the present process dangerous concentrations of the unstable nitric acid anhydride, $N_2O_5$, do not appear to be formed. For reasons not clearly understood, when the reaction of sulfur dioxide with nitric acid is carried out in very concentrated sulfuric acid, that is sulfuric acid having an equivalent $H_2O$ to $SO_3$ ratio less than 1.7, there results a marked increase in the nitrosylsulfuric acid yield. Thus, the reaction of sulfur dioxide with nitric acid in a sulfuric acid solution having an equivalent $H_2O$ to $SO_3$ ratio slightly larger than 1.7, results in substantially the same yield obtained in the neat reaction. However, when the sulfuric acid solution used is more concentrated, for example one having an equivalent $H_2O$ to $SO_3$ ratio of 1.7 or less, the yield is essentially quantitative and is merely dependent upon stopping the reaction at the equivalence point, i.e., where all the $HNO_3$ has reacted. Fuming sulfuric acid solutions of nitric acid having $H_2O$ to $SO_3$ ratios as low as 0.7 and even lower are particularly desirable mediums for the present process. At ratios below about 0.17 the fugacity of the sulfur trioxide introduces operational problems, and some decrease in reaction rate is experienced. Particularly preferred solutions have an equivalent $H_2O$ to $SO_3$ ratio in the range 1.6–0.6. By equivalent ratio is meant the ratio of the sum of the mols of water present, that is, the mols of water combined in $H_2SO_4$ plus uncombined, to the sum of the mols of $SO_3$ present, also combined and uncombined. For example, 100% $H_2SO_4$ has an equivalent ratio of water to $SO_3$ of 1:1; and $H_2SO_4$ having one mol of added water has an equivalent ratio of 2:1, e.g., 2.

The nitric acid employed in the process of the present invention is desirably concentrated nitric acid, and by concentrated is meant that it should be of at least 50% concentration. Red fuming nitric acid is an especially useful feed acid to the process.

The weight percent of nitric acid in the acid mixture may vary over a wide range and may be as little as 1% and as much as 50% and even higher. Particularly advantageous is the use of nitric acid in amounts such that the resulting nitrosylsulfuric acid concentration approximates saturation values in order to afford maximum production per unit reactor volume and yet avoid deposition of solids. The solubility of nitrosylsulfuric acid in approximately 100% sulfuric acid ranges from about 48 grams per 100 grams of solution at 0° C. up to about 68 grams at 50° C. with, of course, a lesser solubility below 0° C. and a greater above 50° C. Although the presence of the precipitated nitrosylsulfuric acid is usually a source of mechanical inconvenience, advantage may be taken of it by removal of the solid nitrosylsulfuric acid by filtration and subsequent recycle of the mother liquor to the reaction zone.

In general, the effective temperature range of the process is defined by the requirement that the reaction medium be a liquid. At lower temperatures in the range about −20 to −40° C., the reaction rate is, of course, slower than at temperatures appreciably higher, and in this range whether there will be a liquid solution rather than a solid solution or solid depends upon the particular acid mixture used and the degree of conversion. While low temperatures favorably affect the solubility of sulfur dioxide in the reaction mixture, faster rates and handling conveniences usually dictate operation at temperatures above 0° C. At atmospheric pressure, the upper temperature limit is defined by the reflux temperature of the mixture, and this is in the range of about 85–330° C. As the conversion of the nitric acid proceeds this upper temperature limit increases due to depletion of the more volatile components. Pressure may be applied to the reaction system in order to make possible a higher liquid phase reaction temperature, but in view of the nature of the materials employed, corrosivity and the like, high pressure operations usually are not advantageous. However, temperatures as high as 200° C. are feasible at superatmospheric pressures. A preferred temperature range is from about −10° C. to about 150° C.

The time required to complete the reaction will vary depending upon the temperature and concentration. Sulfur dioxide has a low solubility in the medium, and this limits the conversion rate; but it may be improved, as noted above, by carrying out the reaction under superatmospheric pressures.

Pressure equipment can be dispensed with, however, in operations at atmospheric pressure by maintaining a high flow rate of $SO_2$ into a well-stirred reaction mixture. Recycle of the exit gas stream, of course, increases the efficiency of the process. At a temperature of about 20–50° C., the reaction is complete in about seven and one-half hours. At higher temperatures the time to completion is much less. The contacting of the sulfur dioxide must be terminated at about the total nitric acid conversion point, else severe yield losses result due to follow-up reactions in which nitrosylsulfuric acid is a reactant.

The end point of the conversion may be determined by several means. The most convenient is the development of a blue to blue-black coloration in the reaction medium. This appears to occur at the equivalence point and is so pronounced as to be a generally reliable guide. A second method is to follow the absorption of the nitrosyl cation ($NO^+$) in the ultraviolet spectrum using prepared standards, conventional techniques, and the known relevant wave lengths in order to stop the reaction when a desired concentration of nitrosylsulfuric acid is reached or the nitrosylsulfuric acid concentration has reached a maximum.

The process of the present invention may be carried out in a batch or a continuous manner in a glass or a corrosion-resistant alloy vessel fitted with a means for efficient stirring. Introduction of the sulfur dioxide into the reaction mixture in the process run at atmospheric pressure is desirably made at a point in the lower portion of the reaction vessel, and in a manner whereby the gas stream is broken up into very small bubbles. When superatmospheric pressures are used, the sulfur dioxide may be introduced in a similar manner or in bulk, but care must be taken not to add any appreciable amount of sulfur dioxide over the stoichiometric requirement. Similarly, in adding sulfur dioxide in bulk to a pressure vessel, provision should be made for adequate removal of the heat of reaction.

When the end point of the reaction is reached, further processing depends upon the ultimate objective. If it is desired to recover the nitrosylsulfuric acid, this is readily accomplished by cooling the reaction mixture to form crystalline nitrosylsulfuric acid which may be collected by filtration and the reconstituted mother liquid returned to the reaction zone.

If the nitrosylsulfuric acid is to be used in situ, the reaction may be stripped of volatiles by passing an inert gas stream through the mixture for a period of about 30 minutes at ambient temperatures, and at higher temperatures the time required is correspondingly less. As a matter of convenience in handling the solution, it may be desirable to dilute the acid mixture before the stripping of the volatiles by the addition of concentrated sulfuric acid or an inert diluent as desired for the subsequent use of the nitrosylsulfuric acid as a nitrosating agent.

The practice of the invention is illustrated in greater detail by the following examples. These examples are to be considered as being illustrative only and not as limiting the scope of the invention.

EXAMPLE I

To a glass turbomixer, equipped with an addition funnel and a Drierite tube to exclude moisture from the atmosphere, was charged 33 ml. (~61 g.) of reagent-grade 25% $SO_3$ (by weight) fuming sulfuric acid. Addition of 14 ml. (~0.34 mol) (22.2 g.) of reagent grade red fuming nitric acid was then made and the temperature of the resulting mixture was adjusted to 30° C. Gaseous sulfur dioxide (25° C.) was bubbled through the acid mixture at 275 ml. per minute with the addition being continued for a period of 6.6 hours and terminated upon the change of the solution color from a light yellow to a dark blue. A series of duplicate runs were made under the above conditions, the temperature being maintained in a range from 30–35° C., and the reaction times to the end point being from 6.6–7.5 hours. The yield of nitrosylsulfuric acid was determined by conventional titrometric procedures and by measuring the absorption spectrum of measured aliquots of the product solution and of the spectrum of known samples and making the appropriate comparisons. The analyses by the two methods were in good agreement. The conversions appeared to be substantially quantitative, and the yields in the series of runs varied from about 78 mol percent, based on nitric acid, to about 85 mol percent. Since unconverted nitric acid is known to be entrained in the effluent gas stream in appreciable amounts, these yields are close to theoretical for nitric acid converted.

EXAMPLE II

The experiment as described in Example I was repeated but with the variation that the flow of the sulfur dioxide gas was continued for a period of two and one-half hours after the appearance of the color change. During this added reaction period, the yield of nitrosylsulfuric acid dropped from 85% at the maximum to about 55%, at which time the experiment was discontinued.

EXAMPLE III

Example I was repeated, using a mixture of red fuming nitric acid and 100% sulfuric acid. The time required to maximum yield was 2.6 hours, and the yield at this point was found to be 73.5% of theory.

Temperature effects were also determined. When the equivalent ratio of water to $SO_3$ was 1, e.g., 100% $H_2SO_4$, a spontaneous but controllable temperature rise of 80° C. occurred under the above experimental conditions. When the equivalent ratio is about 0.8, only a very minor temperature effect is experienced, and at lesser equivalent ratios the temperature effect is not readily apparent.

EXAMPLE IV

Example I was repeated wherein the equivalent ratio of $H_2O$ to $SO_3$ was about 2.0. In order to minimize the spontaneous temperature effect, the $SO_2$ flow rate was maintained at only about one-third that normally employed, e.g., approximately 92 ml. per minute. Nevertheless, there was a substantial spontaneous temperature effect; and, moreover, the yield of nitrosylsulfuric acid was less than 40%.

EXAMPLE V

In the manner described in Example I, a series of experiments were made to demonstrate the effect of sulfur dioxide flow rate upon the time required for maximum conversion of the nitric acid to nitrosylsulfuric acid. The data in Table I following summarizes these experiments:

*Table I*

SULFUR DIOXIDE FLOW RATE AND CONVERSION TIME
(30–35° C.)

| Flow Rate, ml./min. (25° C.) Gram of Initial Solution. | Percent $SO_3$-FSA[1] | $(HNO_3)_0$ [2] | Time to Max. NSA [3] Yield, Hr. |
|---|---|---|---|
| 1.1 | 30 | 7.0 | 12.9 |
| 3.3 | 30 | 7.2 | 8.4 |
| 0.75 | 100% $H_2SO_4$ | 10.1 | 6.0 |
| 3.3 | 100% $H_2SO_4$ | 7.2 | 2.6 |

[1] Fuming sulfuric acid.
[2] Molar concentration
[3] Nitrosylsulfuric acid

These data indicate increased sulfur dioxide flow rates are beneficial in the process. However, as flow rates are increased, the proportionate utilization of the stream decreases, making extremely high rates less practical. By increasing the pressure in the system, a corresponding benefit is obtained.

As will be evident to those skilled in the art, numerous modifications in this process can be made or followed, having in mind the foregoing disclosure and discussion without departing from the spirit or scope of the disclosure or from the scope of the claims.

We claim:

1. A process for the production of nitrosylsulfuric acid, which comprises reacting sulfur dioxide at a temperature in the range −10 to 150° C. with a liquid solution of nitric acid in sulfuric acid, said solution having an equivalent water to $SO_3$ ratio in the range 1.7 to 0.17 and a nitric acid weight percent concentration in the range of from about 1 to 50.

2. The process of claim 1 wherein said equivalent ratio is in the range 1.6 to 0.6.

3. A process for the production of nitrosylsulfuric acid, which comprises reacting sulfur dioxide with a fuming sulfuric acid solution of nitric acid at a temperature in the range −10 to 150° C., said nitric acid being present in an amount in percent by weight of said solution in the range 1–50 and said solution having an equivalent water-to-$SO_3$ ratio greater than 0.17 but less than 1.

(References on following page)

References Cited in the file of this patent

UNITED STATES PATENTS

| | | |
|---|---|---|
| 884,035 | Nield | Apr. 7, 1908 |
| 1,047,576 | Schultze | Dec. 17, 1912 |

OTHER REFERENCES

Mellor: Comprehensive Treatise on Inorganic and Theoretical Chemistry, Longmans, Green and Co., New York, 1928, vol. 8, pages 697 and 698.

Seel, F.: "Recent Aspects of the Inorganic Chemistry of Nitrogen," pp. 7 to 20, Special Publication No. 10, The Chemical Society, London, 1957.

Weber, R.: "Poggendorff Annalen," vol. 130, 1867, pp. 277 to 287 (pp. 283 and 284 of particular interest).